US012602710B2

(12) United States Patent
Doshi et al.

(10) Patent No.: US 12,602,710 B2
(45) Date of Patent: Apr. 14, 2026

(54) ENSEMBLE OF LANGUAGE MODELS FOR IMPROVED USER SUPPORT

(71) Applicant: Intuit, Inc., Mountain View, CA (US)

(72) Inventors: Jineet Hiren Doshi, San Jose, CA (US); Maya Vered Livshits, Campbell, CA (US); Apurva Swarnakar, Chicago, IL (US); Jingyuan Zhang, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 124 days.

(21) Appl. No.: 18/510,541

(22) Filed: Nov. 15, 2023

(65) Prior Publication Data

US 2025/0156911 A1     May 15, 2025

(51) Int. Cl.
*G06Q 30/0282* (2023.01)
*G06F 40/20* (2020.01)

(52) U.S. Cl.
CPC ......... *G06Q 30/0282* (2013.01); *G06F 40/20* (2020.01)

(58) Field of Classification Search
CPC ............. G06Q 30/0282; G06Q 30/015; G06Q 30/016; G06F 40/20; G06F 40/30
See application file for complete search history.

(56) References Cited

U.S. PATENT DOCUMENTS

| | | | | |
|---|---|---|---|---|
| 2018/0211260 | A1* | 7/2018 | Zhang | .................... G06N 20/00 |
| 2019/0158366 | A1* | 5/2019 | Higgins | ............... G06Q 30/016 |
| 2020/0082415 | A1* | 3/2020 | LaTerza | ............. G06Q 30/0201 |
| 2020/0258013 | A1* | 8/2020 | Monnett | ............. H04L 41/5074 |
| 2021/0201327 | A1* | 7/2021 | Konig | .................. G06Q 30/015 |
| 2021/0328888 | A1* | 10/2021 | Rath | .................... H04L 41/5074 |
| 2021/0350257 | A1* | 11/2021 | Colcord | ............. G06F 16/2379 |
| 2022/0101220 | A1* | 3/2022 | Wicaksono | ........ G06Q 10/0633 |
| 2022/0138787 | A1* | 5/2022 | James | ................ G06Q 30/0206 |
| | | | | 705/7.35 |
| 2023/0206287 | A1* | 6/2023 | Sethuraman | ....... G06Q 30/0282 |
| | | | | 705/347 |
| 2023/0379409 | A1* | 11/2023 | Plain | ................... H04M 3/4936 |

(Continued)

OTHER PUBLICATIONS

Jabbar, J., Urooj, I., JunSheng, W., & Azeem, N. (2019, May). Real-time sentiment analysis on E-commerce application. In 2019 IEEE 16th international conference on networking, sensing and control (ICNSC) (pp. 391-396). IEEE. (Year: 2019).*

(Continued)

*Primary Examiner* — John S. Wasaff
(74) *Attorney, Agent, or Firm* — Dinsmore & Shohl LLP

(57) ABSTRACT

Certain aspects of the disclosure provide a method for providing user support by generating recommended response for a customer verbatim with an ensemble of machine learning models. The method includes processing a customer verbatim with a topic model trained to identify a topic associated with the customer verbatim. The method further includes processing the customer verbatim with a sentiment model trained to determine a sentiment of the customer verbatim. The method further includes processing the customer verbatim with an actionability model trained to assign an actionability score to the customer verbatim. The method includes processing the topic, the sentiment, and the actionability score with a recommendation model to generate the recommended response to the customer verbatim.

20 Claims, 5 Drawing Sheets

(56) References Cited

U.S. PATENT DOCUMENTS

| | | | |
|---|---|---|---|
| 2024/0161121 A1* | 5/2024 | Murthi | G06Q 30/016 |
| 2025/0039304 A1* | 1/2025 | Giri | H04M 3/5235 |

OTHER PUBLICATIONS

Kumar, K. S., Desai, J., & Majumdar, J. (Dec. 2016). Opinion mining and sentiment analysis on online customer review. In 2016 IEEE international conference on computational intelligence and computing research (ICCIC) (pp. 1-4). IEEE. (Year: 2016).*

* cited by examiner

300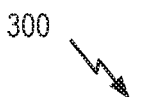

Identify a topic associated with the customer verbatim with a topic model
302

Determine a sentiment associated with the customer verbatim with a
sentiment model trained to determine a customer's satisfaction based
on the customer verbatim
304

Assign an actionability score for the customer verbatim with an
actionability model, wherein the actionability score indicates an
estimated redressability of the customer verbatim
306

Process the topic, the sentiment, and the actionability score with a
recommendation model to generate a recommended response to the
customer verbatim
308

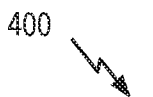

Train a topic model to Identify a topic associated with the customer verbatim
402

Train a sentiment model to determine a sentiment a sentiment, wherein the sentiment indicates the customer verbatim
404

Train an actionability model to assign an actionability score for the customer verbatim, wherein the actionability score indicates an estimated redressability of the customer verbatim
406

Train a recommendation model to generate a recommended response for the customer verbatim, based on the topic, the sentiment, and the actionability score
408

*FIG. 4*

ENSEMBLE OF LANGUAGE MODELS FOR IMPROVED USER SUPPORT

BACKGROUND

Field

Aspects of the present disclosure relate to improved user support in response to customer feedback. In particular, aspects are directed to an ensemble of machine learning models trained to recommend user support responses to customer feedback.

Description of Related Art

Customer support services receive many different types of customer feedback. Such customer feedback may include issues and complaints on a product or service, comments on the company, comments on an industry, and even comments on the customer support service itself. This feedback may also be received in a variety of forms including, for example, reviews, support requests, social media comments, and surveys.

Parsing and deciphering this customer feedback is difficult due to the various types of feedback and forms in which it may be obtained. Some customer feedback may relate to a specific error or issue with a product or service. For example, a customer feedback may regard a warranty issue with a product. Other customer feedback may relate to customer comment on the design of the product. Additionally, it may be difficult to determine whether an individual piece of customer feedback is part of a global issue.

SUMMARY

Certain aspects provide a method for providing user support, comprising: identifying a topic to a customer verbatim with a topic model; determining a sentiment associated with the customer verbatim with a sentiment model trained to determine a customer's satisfaction; assigning an actionability score for the customer verbatim with an actionability model, wherein the actionability score indicates an estimated redressability of the customer verbatim; and processing the topic, the sentiment, and the actionability score with a recommendation model to generate a recommended response to the customer verbatim.

Certain aspects provide a method for training an ensemble of machine learning models to provide recommendations for responding to a customer verbatim, comprising: training a topic model to identify a topic associated with to the customer verbatim; training a sentiment model to determine a sentiment, wherein the sentiment indicates a customer's satisfaction based on the customer verbatim; training an actionability model to assign an actionability score for the customer verbatim, wherein the actionability score indicates an estimated redressability of the customer verbatim; and training a recommendation model to generate a recommended response to the customer verbatim, based on the topic, the sentiment, and the actionability score.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 depicts an example method for generating a recommended response to a customer verbatim.

FIG. 4 depicts an example method for training an ensemble of machine learning models to generate a recommended response to a customer verbatim.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
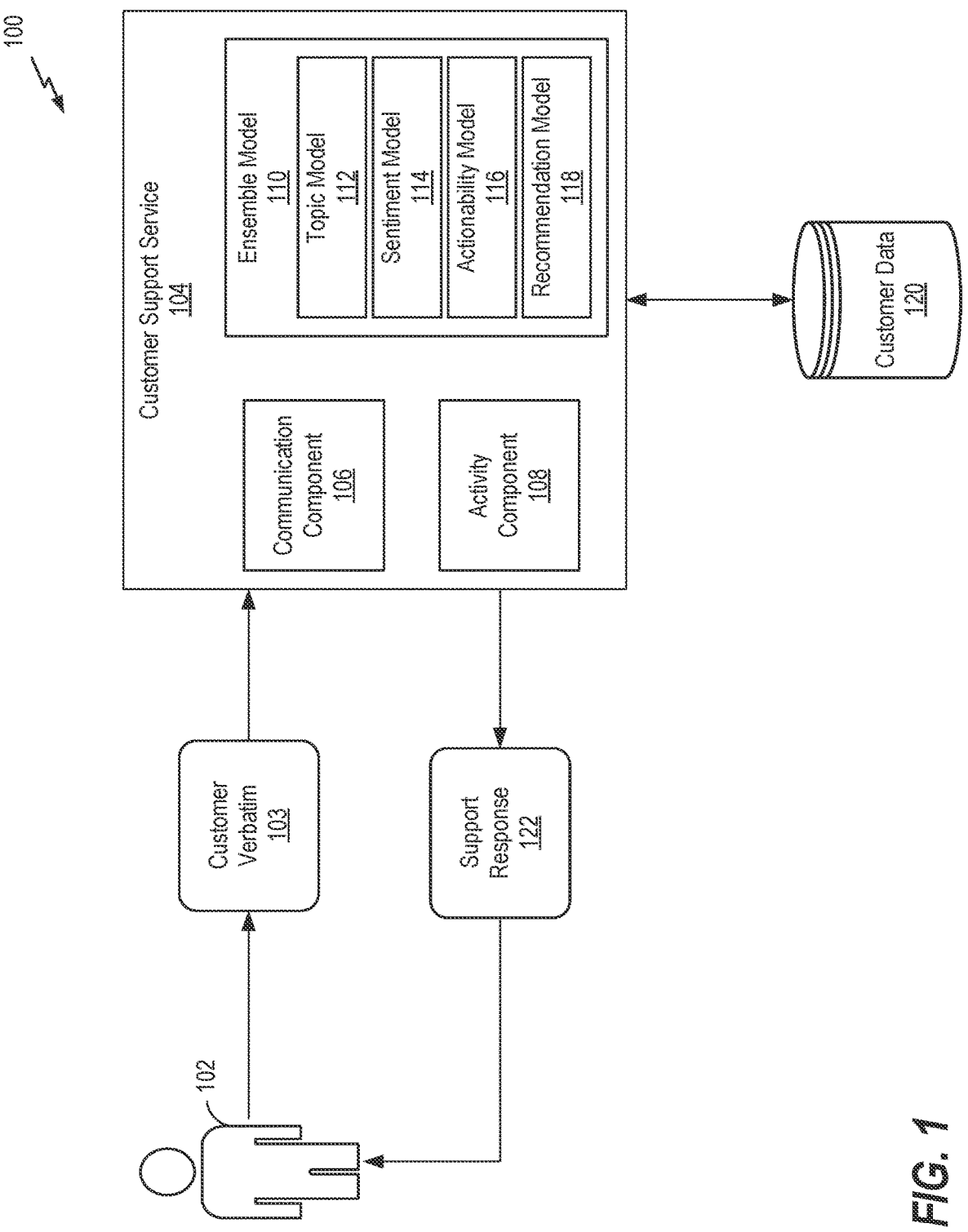
FIG. 1 depicts an example customer support system for parsing and responding to a customer verbatim.

Aspects of the present disclosure provide apparatuses, methods, processing systems, and computer-readable mediums for improved user support in response to customer feedback through an ensemble of machine learning models trained to recommend user support responses to customer feedback.

A customer verbatim may be a customer comment or feedback, often expressing problems or issues with a product, service, or company. A customer verbatim may be provided in a variety of forms and types such that parsing and determining a response (or even whether to respond) to customer verbatim proves difficult due to the nuances of human language. Understanding natural language, such as in a customer verbatim, implicates processing and understanding of the contextual nuances, lexical ambiguity, semantics, colloquialisms, errors, and domain-specific knowledge, and the like, comprising natural language. Accordingly, there is a need for an automated and standardized technique to parse a customer verbatim and recommend a response to improve customer support.

Aspects described herein provide for an ensemble machine learning model architecture capable of both parsing a customer verbatim and generating a recommended response for the customer verbatim. In particular, the ensemble machine learning models described herein utilize a topic model, a sentiment model, and an actionability model trained to parse the customer verbatim and a recommendation model trained to generate a recommended response to the customer verbatim based on the topic model, the sentiment model, and the actionability model.

In some cases, a topic of a given customer verbatim is readily apparent, such as where the customer verbatim explicitly names a product or service. However, in other cases, the topic of the customer verbatim is not readily apparent, such as a generalized or vague comment, for example, "tax the rich!" Further, many individual customer verbatim may regard similar topics, but manually identifying global or large-scale problems proves difficult, for example, an issue with particular aspect of a product. Furthermore, such topics may be dynamic and change over time, requiring continuously identifying and updating global or large-scale problems.

Aspects described herein utilize a topic model of the ensemble model to process customer verbatim to identify a topic associated with each customer verbatim. A topic may be a common theme for several customer verbatims. For example, one or more customer verbatims may be grouped based on common problems, issues, products, services, etc. Further, data associated with the topic model may be used to identify global and dynamic topics for many customer verbatims.

Additionally, a customer verbatim can reveal the customer's sentiment, or true feelings regarding the product, service, company, industry, etc. However, sometimes a customer verbatim may be inconsistent, or even contradictory. For example, a customer's text comment may indicate the customer is unsatisfied with some good or service, but the customer may paradoxically leave a high categorical review score (e.g., four of five stars, a smiley face, or a 9 of 10 score, or the like). Conventional methods may focus on the categorical score, such as a four star review, and fail to consider the text comment, or vice versa, in each case potentially coming to the wrong conclusion of the customer's real sentiment.

Aspects described herein utilize a sentiment model of the ensemble model to process customer verbatim to determine the sentiment of each customer verbatim. A sentiment may reflect the customer's true feelings, for example, satisfaction or dissatisfaction. In some aspects, the sentiment model may beneficially determine the sentiment even when there may be a mismatch between an accompanying score (e.g., stars, survey score, rating, etc.) and the customer verbatim.

Furthermore, not all customer verbatims are actionable, meaning a customer support service may not be able to redress, or resolve the issues or comments in the customer verbatim. For example, a customer verbatim relating to a complaint outside of the customer support service's control, such as a complaint about a law or regulation, may not be remedied by the customer support service. Further, manual determination of actionability may be subjective and non-standardized.

Aspects described herein utilize an actionability model of the ensemble model to process customer verbatim to assign an actionability score to each customer verbatim. An actionability score indicates the redressability of the customer verbatim, for example, whether an action of a customer support service may resolve the customer verbatim. An actionability score may beneficially indicate a customer verbatim for the customer support service to connect with a customer and provide a solution. Further, in some embodiments, the actionability score may indicate a priority for resolution by the customer support service.

Further, aspects described herein utilize a recommendation model of the ensemble model to process the topic, the sentiment, and the actionability score to generate a recommended response for each customer verbatim. Beneficially, the recommendation model may provide a recommended resolution for a customer verbatim, and recommend a communication channel to contact the customer to provide the resolution. Because the recommendation model based the recommended response based on the topic, the sentiment, and the actionability score, the response is tailored to each customer.

Example Customer Support System for Parsing and Responding to Customer Verbatim

FIG. 1 depicts an example customer support system 100, according to examples of the present disclosure. A customer 102 provides feedback, such as comments, reviews, social media posts, comments, messages, calls, chats, survey responses, and the like, as customer verbatim 103 to customer support service 104. Customer support service 104 includes a communication component 106 configured to receive customer verbatim 103. In some embodiments, communication component 106 includes a natural language processing component configured to process customer verbatim 103, for example, to process a telephone call with customer 102 to generate a text representation of customer verbatim 103.

Customer support service 104 further includes an ensemble model 110 configured to parse customer verbatim 103 and generate a recommended response to customer 102. As described herein, ensemble model 110 is trained to identify a topic associated with customer verbatim 103, determine a sentiment of customer 102 based on the customer verbatim 103, and assign an actionability score to customer verbatim 103, whereby the recommended response may be generated. Ensemble model 110 comprises a topic model 112, a sentiment model 114, an actionability model 116, and a recommendation model 118. In some embodiments, the recommended response to the customer verbatim comprises a resolution for the customer verbatim, and customer support service 104 may provide a support response 122 to customer 102 based on the recommended response via communication component 106.

Customer support service 104 includes an activity component 108 configured to monitor the activity of customer 102, such as customer activity with a product or service associated with customer support service, to determine whether the support response 122 resolved the customer verbatim. For example, for a customer verbatim "I need help adding direct deposit for my refund;" the recommended response may include a support response 122 of providing product help to customer 102. The activity of customer 102 may be monitored to determine customer 102 successfully added direct deposit for their refund.

Customer support service 104 is further configured to utilize and store customer data 120. Customer data 120 may include data relating to customer 102, such as customer attributes, customer activity, customer account details, customer verbatim topics, customer verbatim sentiments, and customer verbatim actionability scores, previous customer verbatims, previous recommended responses, and the like.

As described herein, customer support service 104 may beneficially utilize ensemble model 110 to parse various customer verbatims to determine a topic, a sentiment, and an actionability score to generate recommended responses, and respond accordingly in a consistent and efficient manner to improve user support.

Example Workflow for Generating Recommended Responses to Customer Verbatim

Figure 2:
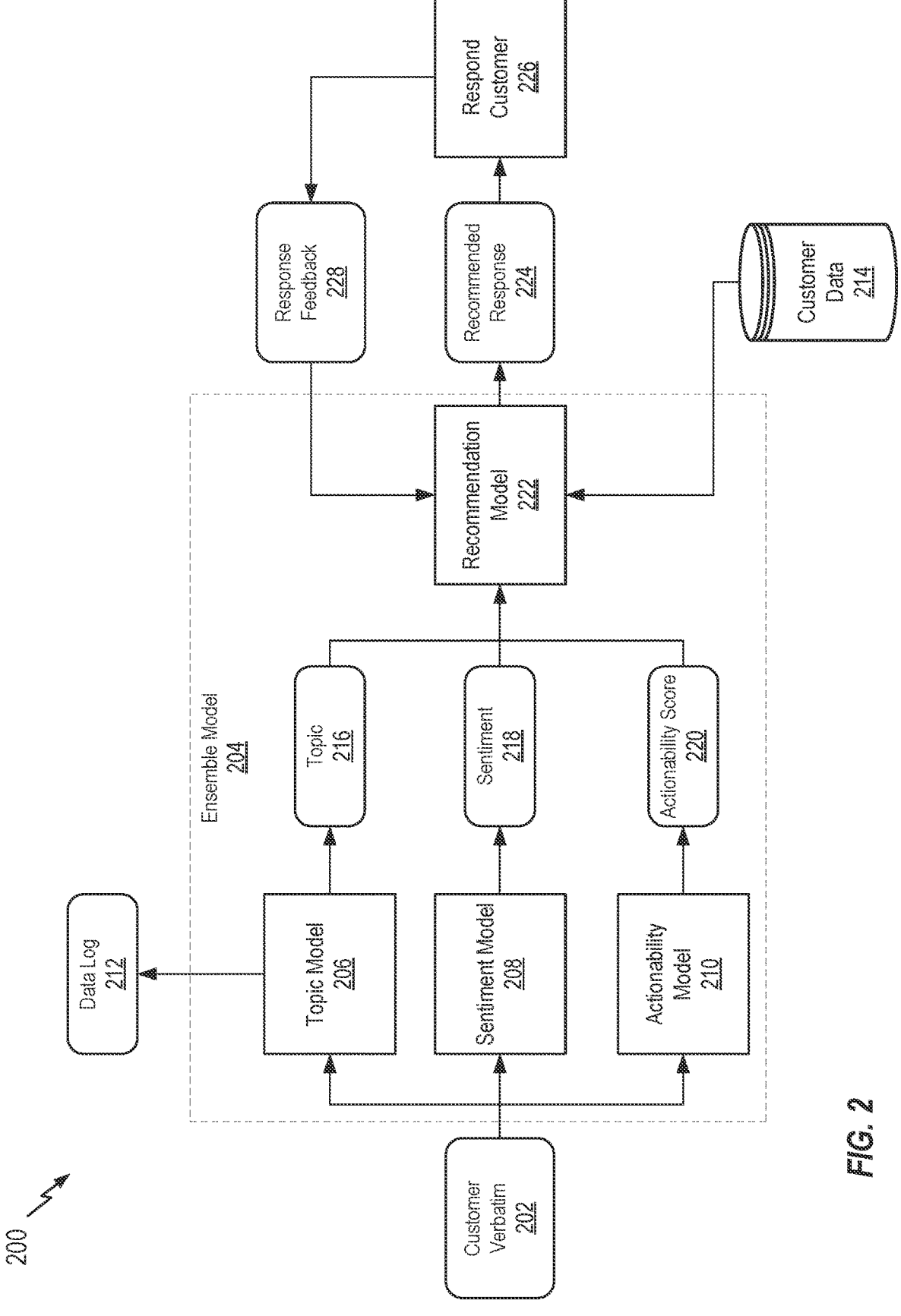
FIG. 2 depicts an example workflow for generating recommended responses to a customer verbatim.

FIG. 2 depicts an example workflow 200 for parsing a customer verbatim and generating a recommendation, according to examples of the present disclosure. Workflow 200 generates recommended response 224 which may be used by a customer support service (e.g., customer support service 104 in FIG. 1), to respond to customer feedback. For example, a recommended response may indicate a recommended resolution for a customer verbatim, and recommend a communication channel to contact the customer to provide the resolution.

A customer verbatim 202 from a customer is provided to ensemble model 204. As described herein, customer verbatim 202 comprises customer feedback, such as comments, reviews, social media posts, comments, messages, calls or chats, survey responses, and the like, obtained by a customer support service.

Ensemble model 204 comprises an ensemble of machine learning models trained to parse a customer verbatim and generate a recommended response. Ensemble model 204 may be generated and trained as described with respect to FIG. 4.

Customer verbatim 202 is provided to a first machine learning model in the ensemble model 204, topic model 206. Topic model 206 is an unsupervised topic model trained to identify a topic 216 associated with the customer verbatim 202. Topic 216 may indicate a theme, category, or grouping, to which the customer verbatim 202 relates. Topic model 206 may be an unsupervised machine learning model configured to use natural language processing techniques to identify topic 216 associated with customer verbatim 202. In some embodiments, topic model 206 is configured to use latent dirichlet allocation (LDA) to identify topic 216. In some embodiments, topic model 206 is configured to use latent semantic analysis (LSA) to identify topic 216. In some embodiments, topic model 206 is configured to use non-negative matrix factorization (NMF) to identify topic 216. In some embodiments, topic model 206 is configured to use BERTopic modeling to identify topic 216. Topic model 206 may further be fine-tuned on domain-specific knowledge to capture the nuances of the language of the business domain. For example, for a product in the tax domain, a customer verbatim of "I owe" may be assigned a topic relating to a tax return, beneficially identifying topics relevant to the business domain.

Further, topic model 206 may generate data log 212 comprising data related to identified topics from many customer verbatims from many customers, for example, which may be used to determine common, popular, or emerging topics for many customer verbatims. In some embodiments, data log 212 may comprise data related to identified topics for customer verbatims processed over a time period, for example, customer verbatims over a previous day, week, month, etc.

Customer verbatim 202 is also provided to a second machine learning model in the ensemble model 204, sentiment model 208. Sentiment model 208 is trained to determine a sentiment 218 of the customer expressed in the customer verbatim 202. A sentiment 218 reflects the customer's feelings, attitude, or gratification with a product, service, and/or business. In some embodiments, sentiment 218 may be classified as positive or negative, for example, sentiment 218 may be satisfaction or dissatisfaction. In some embodiments, sentiment 218 may be a sentiment score, for example, a higher score may indicate satisfaction, while a lower score reflects dissatisfaction.

In some embodiments, sentiment model 208 disregards a score, such as a survey score, a review score (e.g., number of stars), and the like when determining the sentiment of customer verbatim 103. This model beneficially resolves inconsistencies or conflicts between a score and the customer's own words within the customer verbatim 202. Sentiment model 208 may use natural language processing to determine a customer's true feelings. Beneficially, sentiment model 208 may be tuned to capture the nuances of language for the business domain. For example, for a product in the tax domain, a customer verbatim of "I owe" may be determined to have a negative sentiment.

Ensemble model 204 further includes a third machine learning model, actionability model 210 trained to assign an actionability score 220 to customer verbatim 202. An actionability score assigned by actionability model 210 may indicate a redressability of customer verbatim 202. In some embodiments, a higher score indicates customer verbatim 202 is more actionable, and a lower score indicates customer verbatim 202 is less actionable. For example, a customer verbatim of "tax the rich!" may not be addressable by a customer support service and assigned a lower score. As another example, a customer verbatim regarding a request for help using a product may be addressable by a customer support service and assigned a higher score. Beneficially, actionability model 210 may be tuned based on one or more actionable themes (or non-actionable themes), including domain-specific themes. For example, for a tax domain, customer verbatims relating to the IRS, government regulations, political or lobbying actions, angry rants, or general satisfaction, may be non-actionable. Customer verbatims relating to filing a return, or obtaining a refund, for example, may be actionable.

Ensemble model 204 further includes a fourth machine learning model, a recommendation model 222 trained to process topic 216, sentiment 218, and actionability score 220 to generate a recommended response 224 to customer verbatim 202. In some embodiments, recommendation model 222 is further configured to process customer data 214 to generate recommended response 224. Customer data 214 may include data relating to a customer, such as customer attributes, customer activity, customer account details, customer verbatim topics, customer verbatim sentiment, and customer verbatim actionability scores, previous customer verbatim, previous recommended responses, and the like.

Where recommended response 224 indicates for a customer support service to respond to the customer, e.g., customer 102 in FIG. 1, the customer support service responds to the customer at block 226. In some embodiments, recommended response 224 may indicate a communication channel to be used to contact the customer, for example, a telephone call, a chat message, an email message, and the like. In some embodiments, recommended response 224 further indicates a time of day to contact the customer.

The customer may provide additional feedback in response to the contact from the customer support service. In some embodiments, this response feedback 228 may include an additional customer verbatim. In some embodiments, this response feedback 228 may indicate an activity of the customer, for example, monitored by activity component 108 in FIG. 1. For example, the response feedback 228 may indicate the customer resolved an issue expressed in their verbatim based on the contact from the customer support service. As another example, the response feedback 228 may indicate the customer took no further actions based on the contact from the customer support service.

Response feedback 228 may be used to update (e.g., re-train or tune) recommendation model 222 through reinforcement learning. Reinforcement learning trains a model through continuous training based on the environment. Observations from the environment, for example, response feedback 228, are used by the model to continuously learn. Each observation, or response feedback 228, may be assigned a reward or risk, whereby the model learns to take actions that may maximize the reward or minimize the risk.

Beneficially, ensemble model 204 generates recommended responses to customer verbatim such as to resolve and remedy a customer's verbatim. Further, ensemble model 204 parses a customer verbatim to detect different aspects and understand the nuances of human language, including a topic, a sentiment, and an actionability score, which are used in generating a recommended response tailored to the customer verbatim.

Note that FIG. 2 is just one example of a workflow, and other workflows including fewer, additional, or alternative steps are possible consistent with this disclosure.

Example Method for Responding to Customers

FIG. 3 depicts an example method 300 for providing user support, such as with a customer support service (e.g., customer support service 104 in FIG. 1), according to aspects of the present disclosure.

Initially, method 300 begins at step 302 with identifying a topic associated with a customer verbatim with a topic model, such as topic model 206 in FIG. 2. In some embodiments, the topic model is a machine learning model trained to process the customer verbatim allocation to identify the topic associated with the customer verbatim with one or more of: latent dirichlet allocation, latent semantic analysis, non-negative matrix factorization, or BERTopic modeling.

Method 300 proceeds to step 304 with determining a sentiment associated with the customer verbatim with a sentiment model, such as sentiment model 208 in FIG. 2, trained to determine a sentiment, wherein the sentiment indicates a customer's satisfaction based on the customer verbatim.

Method 300 then proceeds to step 306 with assigning an actionability score for the customer verbatim with an actionability model, such as actionability model 210 in FIG. 2, wherein the actionability score indicates an estimated redressability of the customer verbatim. In some embodiments, the actionability score further indicates a priority for responding to the customer verbatim.

Method 300 then proceeds to step 308 with processing the topic, e.g., topic 216, the sentiment, e.g., sentiment 218, and the actionability score, e.g., actionability score 220, with a recommendation model, such as recommendation model 222 in FIG. 2, to generate a recommended response to the customer verbatim.

In some embodiments, the recommended response to the customer verbatim comprises a resolution for the customer verbatim; and method 300 further comprises sending to a user, the resolution for the customer verbatim. In some embodiments, the recommended response comprises a communication channel for the user to contact the customer in regards to the customer verbatim.

In some embodiments, method 300 further comprises receiving an indication of activity of the customer associated with the resolution for the customer verbatim.

In some embodiments, method 300 further comprises updating the recommendation model based on the indication of activity of the customer.

In some embodiments, method 300 is performed on a periodic basis, such as daily, weekly, or monthly, and generates recommended responses for customer verbatim received on over a previous day, week, or month. In some embodiments, method 300 further comprises outputting a list of generated recommended responses for one or more customer verbatim. In some embodiments, the list of generated recommended responses may be based on a priority of the customer verbatim.

Note that FIG. 3 is just one example of a method, and other methods including fewer, additional, or alternative steps are possible consistent with this disclosure.

Example Training Method

FIG. 4 depicts an example method 400 for training an ensemble of machine learning models to provide recommendations for responding to a customer verbatim, such as with a customer support service (e.g., customer support service 104 in FIG. 1), according to aspects of the present disclosure.

Initially, method 400 beings at step 402 with training a topic model, such as topic model 206 in FIG. 2, to identify a topic associated with the customer verbatim. The topic model may be trained to use natural language processing techniques to identify the topic associated with the customer verbatim. In some embodiments, the topic model is a machine learning model trained to process the customer verbatim allocation to identify the topic associated with the customer verbatim with one or more of: latent dirichlet allocation, latent semantic analysis, non-negative matrix factorization, or BERTopic modeling. The topic model may be trained through unsupervised learning. Unsupervised learning trains the model based on unlabeled training data by training the model to take the input and transform it into an output. The model identifies commonalities in the training data, for example, grouping various customer verbatims based on an identified common theme.

Method 400 proceeds to step 404 with training a sentiment model, such as sentiment model 208 in FIG. 2, to determine a sentiment, wherein the sentiment indicates a customer's satisfaction based on the customer verbatim. The sentiment model may model relationships between customer verbatims and customer satisfaction. The sentiment model may be trained through supervised learning. Supervised learning trains the model based on labeled training data, which includes one or more inputs and a desired output, for example a labeled customer verbatim and a desired determined sentiment. The sentiment model may be trained based on a loss function, for example, to reach a minimum loss, or satisfy target performance. The loss function may be based on the determined sentiment and the desired output. The model may be adjusted, for example, adjusting one or more weights associated with the model, to reduce the loss.

Method 400 then proceeds to step 406 with training an actionability model, such as actionability model 210 in FIG. 2, to assign an actionability score for the customer verbatim, wherein the actionability score indicates an estimated redressability of the customer verbatim. The actionability model may be a classification model, for example, a text classification model, trained through supervised learning. As described, supervised learning trains the model based on labeled training data, for example, a labeled customer verbatim as an input and a desired actionability score.

Method 400 then proceeds to step 408 with training a recommendation model, such as recommendation model 222 in FIG. 2, to generate a recommended response to the customer verbatim, based on the topic, e.g., topic 216, the sentiment, e.g., sentiment 218, and the actionability score, e.g., actionability score 220. The recommendation model may be trained through reinforcement learning. As described herein, reinforcement learning trains a model through continuous training based on the environment. Observations from the environment, are used by the model to continuously learn. Each observation may be assigned a reward or risk, whereby the model learns to take actions that may maximize the reward or minimize the risk. The recommendation model is trained to utilize the topic, the sentiment, and the actionability score to generate a recommended response to the given customer verbatim. The recommendation model may utilize a decision matrix A technical problem with a recommendation model trained through reinforcement learning is early in training; the model struggles to make inferences or recommendations because it does not have enough information, often called the "cold-start problem." The recommendation model described herein may beneficially include a decision matrix instantiated with priors capturing prior knowledge, to overcome this initial problem. For example, prior knowledge may indicate that negative sentiment customer verbatim may be recommended an immediate response compared to a positive sentiment customer verbatim.

In some embodiments, the recommended response to the customer verbatim comprises a resolution for the customer verbatim; and method 400 further comprises sending to a user, the resolution for the customer verbatim. In some embodiments, the recommended response comprises a communication channel for the user to contact the customer in regards to the customer verbatim.

In some embodiments, method 400 further comprises receiving an indication of activity of the customer associated with the resolution for the customer verbatim.

In some embodiments, method 400 further comprises updating the recommendation model based on the indication of activity of the customer. Updating the recommendation model based on the indication of activity of the customer may comprise updating the model through reinforcement learning.

Note that FIG. 4 is just one example of a method, and other methods including fewer, additional, or alternative steps are possible consistent with this disclosure.

Figure 5:
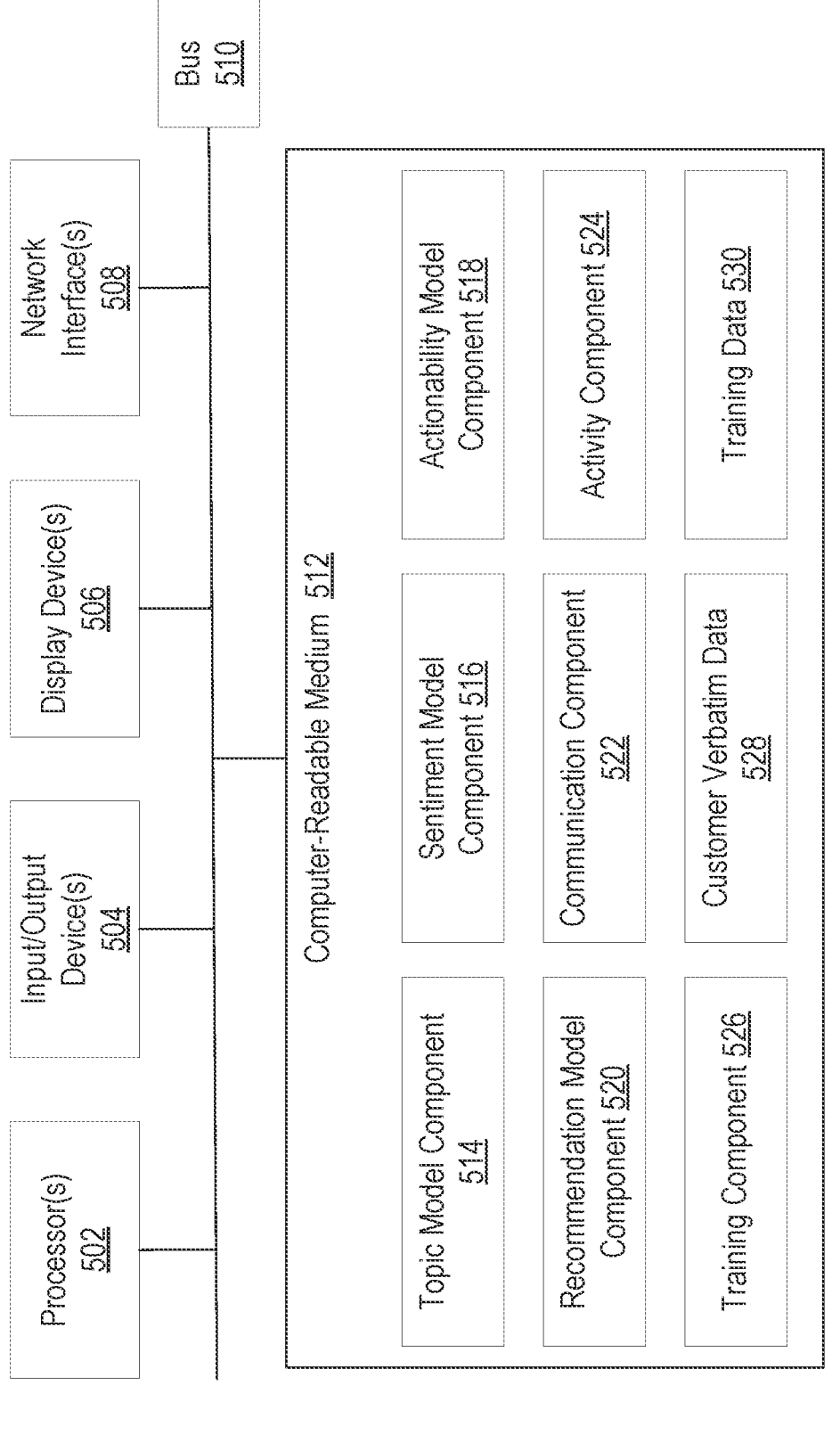
FIG. 5 depicts an example processing system with which aspects of the present disclosure can be performed.

Example Processing System for Generating Recommended Responses for Customer Verbatim FIG. 5 depicts an example processing system 500 configured to perform various aspects described herein, including, for example, workflow 200 as described above with respect to FIG. 2, method 300 as described above with respect to FIG. 3, or method 400 as described above with respect to FIG. 4.

Processing system 500 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes a topic model component 514, a sentiment model component 516, an actionability model component 518, a recommendation model component 520, a communication component 522, an activity component 524, a training component 526, customer verbatim data 528, and training data 530.

In certain embodiments, topic model component 514 is configured to identify a topic for the customer verbatim, for example, as described with respect to step 302 of FIG. 3. In certain embodiments, sentiment model component 516 is configured to determine a sentiment associated with the customer verbatim, for example, as described with respect to step 304 of FIG. 3.

In certain embodiments, actionability model component 518 is configured to assign an actionability score for the customer verbatim, for example, as described with respect to step 306 of FIG. 3. In certain embodiments, recommendation model component 520 is configured to generate a recommended response based on the topic, the sentiment, and the actionability score, for example, as described with respect to step 308 of FIG. 3.

In certain embodiments, communication component 522 is configured to send and receive communications with a customer, for example, one or more customer verbatim. Communication component 522 is further configured to utilize one or more communication channels, such as a telephone, a chat service, an email service, a social media service, and the like, to communicate. Customer verbatim may be stored as customer verbatim data 528.

In certain embodiments, activity component 524 is configured to monitor an activity of a customer, for example, with a product or service to determine whether the response resolved the customer verbatim.

In certain embodiments, training component 526 is configured to train one or more machine learning models, for example, an ensemble of topic model, sentiment model, actionability model, and recommendation model based on training data 530, such as described with respect to FIG. 4.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method for providing user support, comprising: identifying a topic associated with a customer verbatim with a topic model; determining a sentiment associated with the customer verbatim with a sentiment model trained to determine a customer's satisfaction based on the customer verbatim; assigning an actionability score for the customer verbatim with an actionability model, wherein the actionability score indicates an estimated redressability of the customer verbatim; and processing the topic, the sentiment, and the actionability score with a recommendation model to generate a recommended response to the customer verbatim.

Clause 2: The method of Clause 1, wherein: the recommended response to the customer verbatim comprises a resolution for the customer verbatim; and the method further comprises sending to a user, the resolution for the customer verbatim.

Clause 3: The method of Clause 2, wherein the recommended response comprises a communication channel for the user to contact the customer in regards to the customer verbatim.

Clause 4: The method of any one of Clauses 2-3, further comprising receiving an indication of activity of the customer associated with the resolution for the customer verbatim.

Clause 5: The method of Clause 4, further comprising updating the recommendation model based on the indication of activity of the customer.

Clause 6: The method of any one of Clauses 1-5, wherein the topic model is a machine learning model trained to process the customer verbatim allocation to identify the topic associated with the customer verbatim with one or more of: latent dirichlet allocation, latent semantic analysis, non-negative matrix factorization, or BERTopic modeling.

Clause 7: The method of any one of Clauses 1-6, wherein the actionability score further indicates a priority for responding to the customer verbatim.

Clause 8: A method for training an ensemble of machine learning models to provide recommendations for responding to a customer verbatim, comprising: training a topic model to identify a topic associated with the customer verbatim; training a sentiment model to determine a sentiment, wherein the sentiment indicates a customer's satisfaction based on the customer verbatim; training an actionability model to assign an actionability score for the customer verbatim, wherein the actionability score indicates an estimated redressability of the customer verbatim; and training a recommendation model to generate a recommended response to the customer verbatim, based on the topic, the sentiment, and the actionability score.

Clause 9: The method of Clause 8, wherein the topic model is trained to identify the topic associated with the customer verbatim with one or more of: latent dirichlet allocation, latent semantic analysis, non-negative matrix factorization, or BERTopic modeling.

Clause 10: The method of any one of Clauses 8-9, wherein: the recommended response to the customer verbatim comprises a resolution for the customer verbatim; and the method further comprises sending to a user, the resolution for the customer verbatim.

Clause 11: The method of Clause 10, wherein the recommended response comprises a communication channel for the user to contact the customer in regards to the customer verbatim.

Clause 12: The method of any one of Clauses 10-11, further comprising receiving an indication of activity of the customer associated with the resolution for the customer verbatim.

Clause 13: The method of Clause 12, further comprising updating the recommendation model based on the indication of activity of the customer.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training an ensemble of machine learning models to provide recommendations for responding to a customer verbatim, comprising:

training through unsupervised learning, with a first training dataset comprising unlabeled data, a topic model to group, using natural language processing, the unlabeled data of the first training dataset based on a common theme, each group associated with a topic, whereby the topic model is trained to parse the customer verbatim using natural language processing and output an indication of a topic of the customer verbatim based on association of the customer verbatim with the common theme;

training through supervised learning, with a second training dataset comprising sets of sentiment labels, each set of the sets of sentiment labels comprising a labeled customer verbatim and a desired determined sentiment, a sentiment model to classify, using natural language processing, the customer verbatim and output an indication of a sentiment of a customer of the customer verbatim, wherein the sentiment indicates a customer's satisfaction based on the customer verbatim, and the sentiment model is trained to reach a minimum of a loss of a loss function by adjusting one or more weights of the sentiment model to reduce the loss;

training through supervised learning, with a third training dataset comprising sets of actionability labels, each set of the sets of actionability labels comprising a labeled customer verbatim and a desired actionability score, an actionability model to classify, using natural language processing, the customer verbatim and output an actionability score for the customer verbatim, wherein the actionability score indicates an estimated resolvability of the customer verbatim by a support service; and training with reinforcement learning, with a fourth training dataset, a recommendation model to process the output of the topic model, the output of the sentiment model, and the output of the actionability model, and output a recommended response to the customer verbatim, based on the topic, the sentiment, and the actionability score, and the recommendation model is instantiated with a decision matrix capturing prior knowledge.

2. The method of claim 1, wherein the topic model is trained with one or more of: latent dirichlet allocation, latent semantic analysis, non-negative matrix factorization, or BERTopic modeling.

3. The method of claim 1, wherein the recommendation model is further trained to indicate a communication channel for a user to contact a customer in regards to the customer verbatim.

4. The method of claim 1, wherein the topic model is further trained based on domain-specific knowledge associated with a domain of the support service.

5. The method of claim 1, wherein the topic model is further trained to output a data log indicating a plurality of topics associated with a plurality of customer verbatims by grouping one or more of the plurality of customer verbatims based on a common topic of the plurality of topics.

6. The method of claim 1, wherein the indication of the sentiment of the customer comprises a positive or negative classification of the customer verbatim.

7. The method of claim 1, wherein:

the indication of the sentiment of the customer comprises a satisfaction score; and the sentiment model is further trained based on domain-specific knowledge associated with a domain of the support service.

8. The method of claim 1, wherein the actionability score further indicates a priority for responding to the customer verbatim.

9. The method of claim 1, wherein the recommendation model is further trained to indicate a time of day to contact the customer.

10. The method of claim 1, further comprising:

identifying a topic of a subsequent customer verbatim, by:

processing, with the topic model, the subsequent customer verbatim; and outputting, by the topic model, the topic of the subsequent customer verbatim;

determining a sentiment of the subsequent customer verbatim, by:

processing, with the sentiment model, the subsequent customer verbatim; and outputting, by the topic model, the sentiment of the subsequent customer verbatim;

assigning an actionability score for the subsequent customer verbatim, by:

processing, with the actionability model, the subsequent customer verbatim; and outputting, by the topic model, the sentiment of the subsequent customer verbatim; and generating a recommended response to the subsequent customer verbatim, by:

processing, with the recommendation model, the topic, the sentiment, and the actionability score of the subsequent customer verbatim; and outputting, the recommended response.

11. The method of claim 10, wherein:

the recommended response to the subsequent customer verbatim comprises a resolution for the subsequent customer verbatim, and the method further comprises sending, to a user, the resolution for the subsequent customer verbatim.

12. The method of claim 11, further comprising receiving an indication of activity of the customer associated with the resolution for the subsequent customer verbatim.

13. The method of claim 12, further comprising updating the recommendation model based on the indication of activity.

14. A processing system, comprising: a memory comprising computer-executable instructions; and a processor configured to execute the computer-executable instructions and cause the processing system to:

train through unsupervised learning, with a first training dataset comprising unlabeled data, a topic machine learning model to, group, using natural-language processing techniques, the unlabeled data of the first training dataset based on a common theme, each group associated with a topic, whereby the topic machine learning model is trained to parse a customer verbatim and output an indication of the topic of the customer verbatim based on association of the customer verbatim with the common theme;

train through supervised learning, with a second training dataset comprising sets of sentiment labels, each set of the sets of sentiment labels comprising a labeled customer verbatim and a desired determined sentiment, a sentiment machine learning model to classify, using natural language processing, the customer verbatim and output a indication of a sentiment of a customer of the customer verbatim, wherein the sentiment indicates a customer's satisfaction based on the customer verbatim, and the sentiment machine learning model is trained to reach a minimum of a loss of a loss function by adjusting one or more weights of the sentiment machine learning model to reduce the loss;

train through supervised learning, with a third training dataset comprising sets of actionability labels, each set of the sets of actionability labels comprising a labeled customer verbatim and a desired actionability score, an actionability machine learning model to classify, using natural language processing, the customer verbatim and output an actionability score for the customer verbatim, wherein the actionability score indicates an estimated resolvability of the customer verbatim by a support service; and train with reinforcement learning, with a fourth training dataset, a recommendation model to process the output of the topic machine learning model, the output of the sentiment machine learning model, and the output of the actionability machine learning model, and output a recommended response based on the topic, the sentiment, and the actionability score, and the recommendation model is instantiated with a decision matrix capturing prior knowledge.

15. The processing system of claim 14, wherein the topic machine learning model is trained with one or more of: latent dirichlet allocation, latent semantic analysis, non-negative matrix factorization, or BERTopic modeling.

16. The processing system of claim 14, wherein the recommendation model is further trained to indicate a communication channel for a user to contact a customer in regards to the customer verbatim.

17. The processing system of claim 14, wherein the topic machine learning model is further trained based on domain-specific knowledge associated with a domain of the support service.

18. The processing system of claim 14, wherein the topic machine learning model is further trained to output a data log indicating a plurality of topics associated with a plurality of customer verbatims by grouping one or more of the plurality of customer verbatims based on a common topic of the plurality of topics.

19. The processing system of claim 14, wherein the indication of the sentiment of the customer comprises a positive or negative classification of the customer verbatim.

20. The processing system of claim 14, wherein:

the indication of the sentiment of the customer comprises a satisfaction score; and the sentiment machine learning model is further trained based on domain-specific knowledge associated with a domain of the support service.

\* \* \* \* \*